US011286696B2

(12) United States Patent
Cho et al.

(10) Patent No.: US 11,286,696 B2
(45) Date of Patent: Mar. 29, 2022

(54) TAILGATE LATCH ASSEMBLY FOR VEHICLE

(71) Applicants: HYUNDAI MOTOR COMPANY, Seoul (KR); KIA MOTORS CORPORATION, Seoul (KR); PYEONG HWA AUTOMOTIVE CO., LTD., Daegu (KR)

(72) Inventors: Ki-Hyun Cho, Hwaseong-si (KR); Kyung-Min Lee, Hwaseong-si (KR)

(73) Assignees: Hyundai Motor Company, Seoul (KR); Kia Motors Corporation, Seoul (KR); PYEONG HWA AUTOMOTIVE CO LTD, Daegu (KR)

( * ) Notice: Subject to any disclaimer, the term of this patent is extended or adjusted under 35 U.S.C. 154(b) by 226 days.

(21) Appl. No.: 16/699,984

(22) Filed: Dec. 2, 2019

(65) Prior Publication Data
US 2020/0190872 A1 Jun. 18, 2020

(30) Foreign Application Priority Data
Dec. 17, 2018 (KR) .................. 10-2018-0163476

(51) Int. Cl.
*E05B 85/26* (2014.01)
*E05B 81/06* (2014.01)
(Continued)

(52) U.S. Cl.
CPC .............. *E05B 85/26* (2013.01); *E05B 81/06* (2013.01); *E05B 81/14* (2013.01); *E05B 83/16* (2013.01);
(Continued)

(58) Field of Classification Search
CPC ... E05Y 2900/546; E05B 83/16; E05B 85/26; E05B 85/045; E05B 81/15; E05B 81/14; E05B 81/06
See application file for complete search history.

(56) References Cited

U.S. PATENT DOCUMENTS

2011/0278867 A1* 11/2011 Watanabe ............... E05B 85/26
292/341.16
2015/0308161 A1* 10/2015 Rosales ................... E05B 77/06
292/195
(Continued)

FOREIGN PATENT DOCUMENTS

DE 202008016949 U1 * 5/2010 ............ E05B 85/26
JP 3143586 B2 * 3/2001
(Continued)

*Primary Examiner* — Kristina R Fulton
*Assistant Examiner* — James Edward Ignaczewski
(74) *Attorney, Agent, or Firm* — Morgan, Lewis & Bockius LLP

(57) ABSTRACT

A tailgate latch assembly for restraining a striker of a tailgate, which is opened or closed rearward of a vehicle, or for releasing restraint of the striker includes: a pawl configured to be rotated by a drive motor, the pawl being supported resiliently in a direction opposite to a direction of being rotated by the drive motor in a housing; a claw supported resiliently in a direction in which restraint of the striker is released in the housing, the claw being configured to be rotated in a direction opposite to the direction of being supported resiliently when the striker is restrained in the claw; and a memory lever having a first end for supporting a side face of the pawl when the pawl is rotated beyond a predetermined angle by the drive motor and a second end fixed to the housing.

14 Claims, 12 Drawing Sheets

(51) Int. Cl.
 *E05B 81/14* (2014.01)
 *E05B 83/16* (2014.01)
 *E05B 85/04* (2014.01)
 *B60J 5/10* (2006.01)

(52) U.S. Cl.
 CPC ............ *E05B 85/045* (2013.01); *B60J 5/101* (2013.01); *E05Y 2201/702* (2013.01); *E05Y 2201/704* (2013.01); *E05Y 2900/546* (2013.01)

(56) References Cited

U.S. PATENT DOCUMENTS

2017/0159334 A1\* 6/2017 Ishiguro .................. E05B 77/36
2018/0223568 A1\* 8/2018 Cho ........................ E05B 81/15

FOREIGN PATENT DOCUMENTS

KR 10-0656599 B1 12/2006
KR 100656599 B1 \* 12/2006
WO WO-2014036991 A2 \* 3/2014 ............. E05B 81/15

\* cited by examiner

TAILGATE LATCH ASSEMBLY FOR VEHICLE

CROSS-REFERENCE TO RELATED APPLICATIONS

This application claims priority to Korean Patent Application No. 10-2018-0163476, filed on Dec. 17, 2018, the disclosure of which is incorporated herein by reference in its entirety.

TECHNICAL FIELD

The present disclosure relates to a tailgate latch assembly for restraining a tailgate which is opened or closed rearward of a vehicle or releasing restraint of the tailgate.

BACKGROUND

Vehicles such as a sports utility vehicle (SUV) and a van are equipped with a tailgate which is opened or closed rearward of the vehicle.

In general, an upper end of the tailgate is hinged to a vehicle body of the vehicle and the tailgate is controlled to be opened or closed by restraining a lower end thereof or releasing the lower end from restraint.

FIGS. 1 to 3 show a tailgate latch assembly 110 for a vehicle according to prior art.

When a user operates an outside handle to open the tailgate in a state where the latch 110 is locked as shown in FIG. 1, electric power is supplied to a drive motor 112 for a predetermined time (for example, 0.5 seconds). When electric power is applied to the drive motor 112, a worm gear 113, a wheel gear 114 and the like which are coupled to the drive motor 112 are rotated.

As shown in FIG. 2, when the wheel gear 114 is rotated, an actuation protrusion 114a formed on one side of the wheel gear 114 hits an end of a pawl 115 whereby the pawl 115 is rotated. When the pawl 115 is rotated, a claw 116 whose rotation is restrained by the pawl 115 is rotated by means of a spring so that a striker 121 can be broken away from the claw 116 whereby restraint of the tailgate latch assembly 110 is released.

On the other hand, if electric supply is terminated in a state where locking of the tailgate latch assembly 110 is not fully released for a time period (for example, 0.5 seconds) during which electric power is applied to the drive motor 112, the pawl 115 and the claw 116 are locked in a first step locking state while they are rotated by means of spring force of the springs mounted respectively to the pawl 115 and the claw 116 in a direction opposite to the direction at the time when the drive motor 112 is operated. Therefore, the striker 121 cannot be released from the claw 116 and thus, the tailgate cannot be opened (see FIG. 3).

If the time period for supplying electric power to the drive motor 112 is set to be longer, there is a problem that the tailgate latch assembly 110 cannot be locked when the user intends to close the tailgate while electric power is being applied after the tailgate is opened.

In order to solve this problem, another switch (not shown) is further installed in addition to the existing switch 117 to increase the time period for supplying electric power to the drive motor 112 such that position of the claw 116 is detected in the locked state and the released state, respectively, thereby preventing actuation of the tailgate latch assembly from being stopped at a position rather than the locked or released state.

However, installation of the two switches needs not only an additional switch but also an additional configuration for installing the switches, such as wiring. This leads to problems regarding increase of process and cost.

SUMMARY OF THE DISCLOSURE

The present disclosure has been made to solve the above-described problems associated with the prior art. An object of the present disclosure is to provide a tailgate latch assembly for a vehicle that can prevent releasing actuation from being stopped while a latch is released by means of a mechanical mechanism at the time when a pawl is actuated.

Other objects and advantages of the present disclosure can be understood by the following description and become apparent with reference to the embodiments of the present disclosure. It would be understood by those having ordinary skill in the art to which the present disclosure pertains that the objects and advantages of the present disclosure can be realized by the means as claimed and combinations thereof.

In accordance with one aspect of the present disclosure, there is provided a tailgate latch assembly for a vehicle for restraining a striker of a tailgate, which is opened rearward of the vehicle, or for releasing restraint of the striker, comprising: a pawl configured to be rotated by a drive motor, the pawl being supported resiliently in a direction opposite to a direction of being rotated by the drive motor in a housing; a claw supported resiliently in a direction in which restraint of the striker is released in the housing, the claw being configured to be rotated in a direction opposite to the direction of being supported resiliently when the striker is restrained in the claw; and a memory lever having a first end for supporting a side face of the pawl when the pawl is rotated beyond a predetermined angle by the drive motor and a second end fixed to the housing.

The tailgate latch assembly is characterized in that a stop plane for supporting one side face of the pawl is formed at one end of the memory lever, another stop plane corresponding to the stop plane of the memory lever is formed at one end of the pawl to face the stop plane of the memory lever, and the stop plane of the memory lever is arranged to face the pawl so as to prevent the pawl from returning.

The tailgate latch assembly is characterized in that one end of the pawl is formed with an inclined plane such that the pawl can pass over the memory lever when the pawl is rotated in a state where the striker is restrained by the claw and one end of the memory lever is formed with another inclined plane corresponding to the inclined plane formed at one end of the pawl.

The tailgate latch assembly is characterized in that the inclined plane formed at one end of the pawl is formed to be inclined in such a manner that height thereof is getting higher toward the claw.

The tailgate latch assembly is characterized in that the pawl comprises a metallic insert located in the inside thereof and a body injection-molded on the outside of the insert.

The tailgate latch assembly is characterized in that the insert is made of steel.

The tailgate latch assembly is characterized in that a part of the insert is exposed to the outside of the body.

The tailgate latch assembly is characterized in that a part of the insert is exposed to the outside of the body to form a stopper for preventing rotation of the claw.

The tailgate latch assembly is characterized in that the memory lever is supported resiliently to the housing such that one end thereof supporting the side face of the pawl is raised or lowered with respect to the other end thereof fastened to the housing.

The tailgate latch assembly is characterized in that the memory lever comprises a resilient member made of a metal material and having one end fastened to the housing and a body injection-molded on the outside of the resilient member.

The tailgate latch assembly is characterized in that a fastening hole is formed at one end of the resilient member and the resilient member is fastened to the housing by penetrating a fastening bolt through the fastening hole and screwing the bolt to the housing.

The tailgate latch assembly is characterized in that the other end of the resilient member protrudes to one side of the body to serve as a resilient part supported resiliently to one side of the housing.

The tailgate latch assembly is characterized in that one side face of the wheel gear is formed with a stopper for stopping rotation of a wheel gear at the time when the pawl is separated from the claw and a bottom face of the pawl is formed with a catching ledge to be caught by the stopper wherein when the pawl is separated from the claw, the catching ledge is caught by the stopper whereby rotation of the pawl is stopped.

The tailgate latch assembly is characterized in that one side face of the claw is formed with a release protrusion for raising the memory lever at the time when electric power to the drive motor is cut off and thus the pawl returns.

The tailgate latch assembly is characterized in that a switch for detecting separation of the pawl from the claw is installed at one side of the housing and the housing is provided with a plate for operating the switch at the time when the pawl is separated from the claw.

According to the tailgate latch assembly of the present disclosure having the features as described above, it is configured such that resilient force functioning to return the pawl to its original position is different from the direction of raising the memory lever, so that the pawl is stably maintained in the restrained state. In other words, by virtue of the memory lever further mounted to the housing, it is possible to prevent a phenomenon that releasing actuation is stopped in the middle of releasing because the memory lever prevents the pawl from rotating toward the claw when the pawl rotates beyond a predetermined angle and thus passes over the memory lever. When the pawl is rotated by a predetermined angle by the drive motor, the memory lever prevents the pawl from rotating in the opposite direction so that any phenomenon that may occur when the pawl is caught by the claw can be prevented even if electric power to the drive motor is cut off.

Further, only with a single switch, it is possible to detect whether the pawl is opened.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
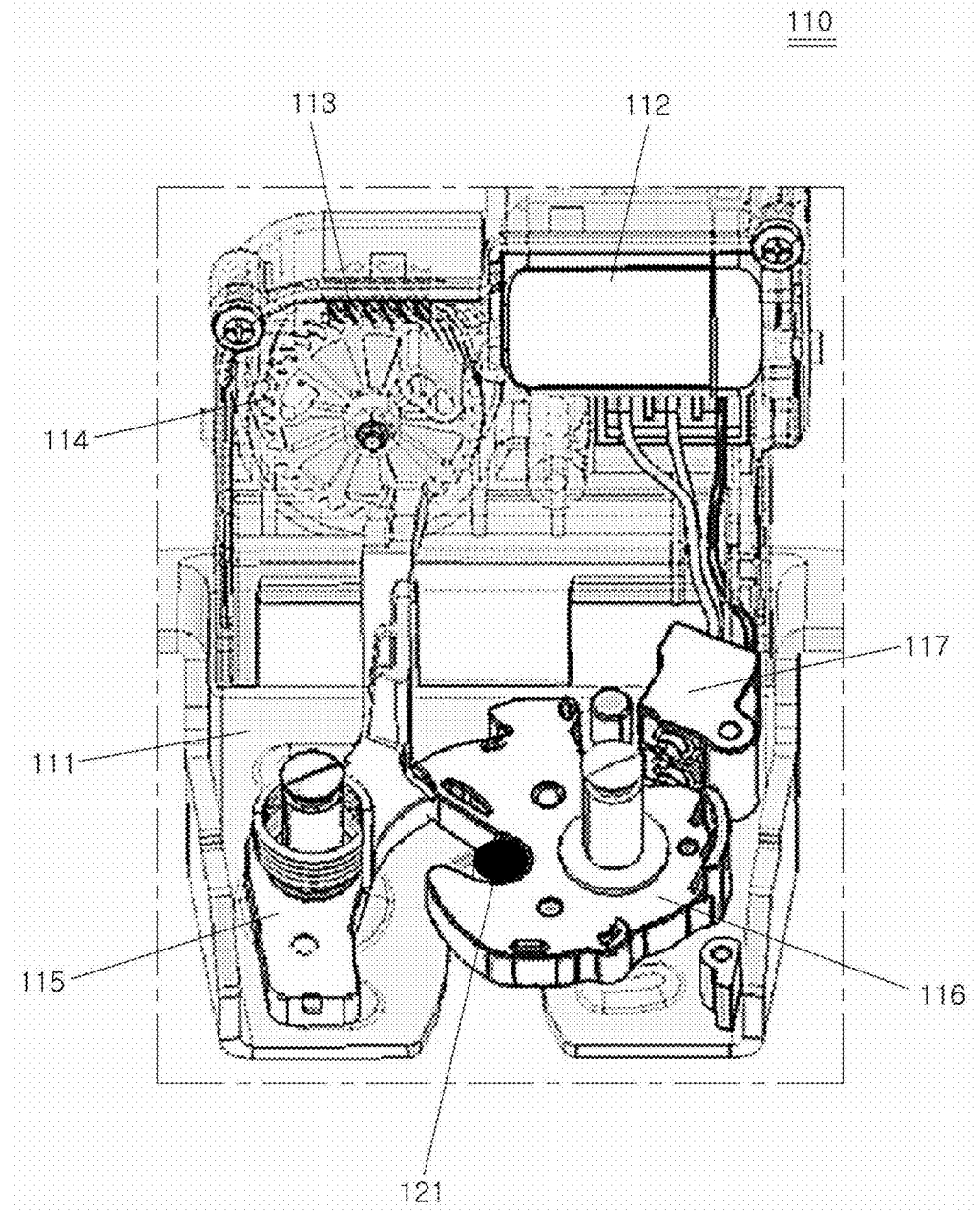
FIG. 1 is a perspective view of a tailgate latch assembly for a vehicle according to the prior art when the tailgate latch assembly is locked.
Figure 2:
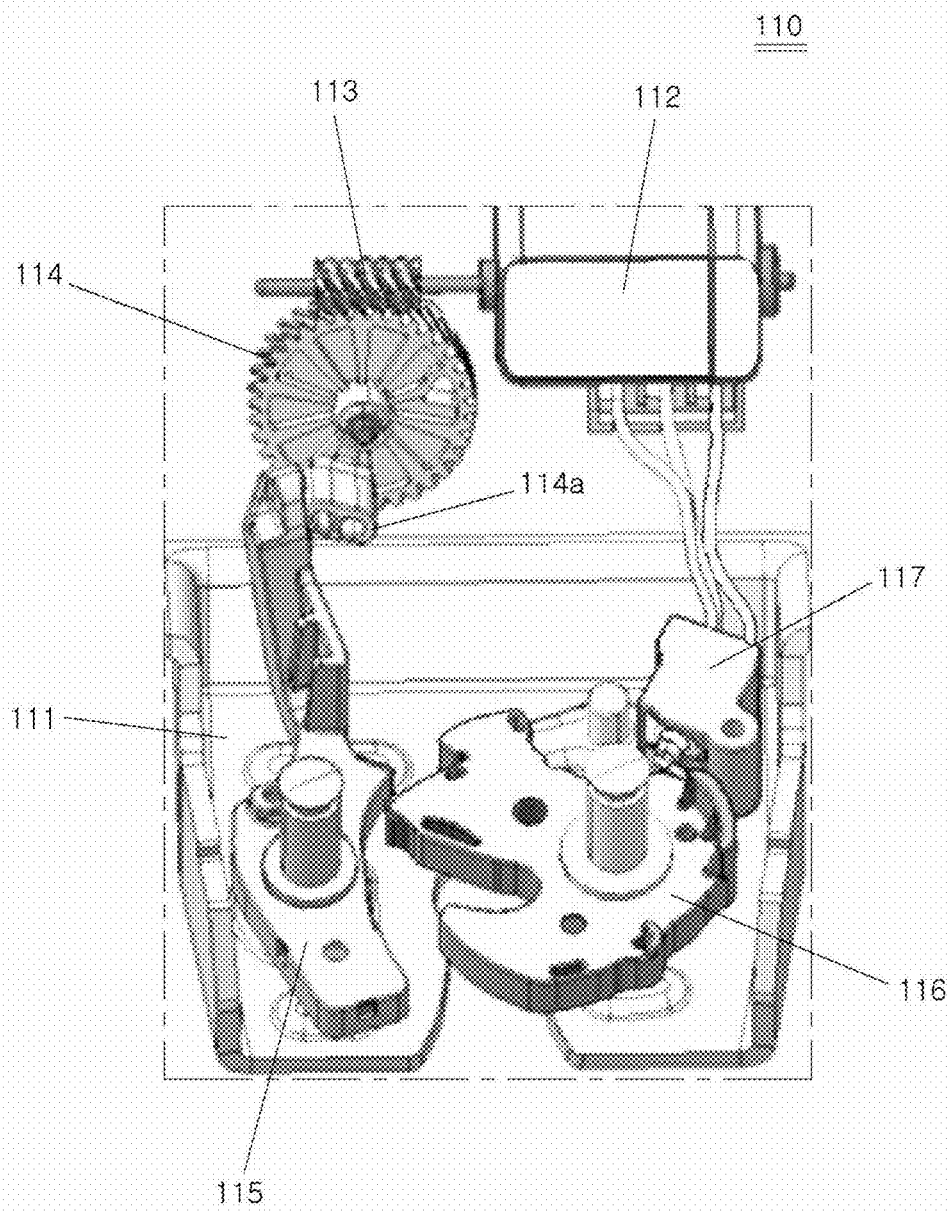
FIG. 2 is a perspective view of a tailgate latch assembly for a vehicle according to the prior art when the tailgate latch assembly is released.
Figure 3:
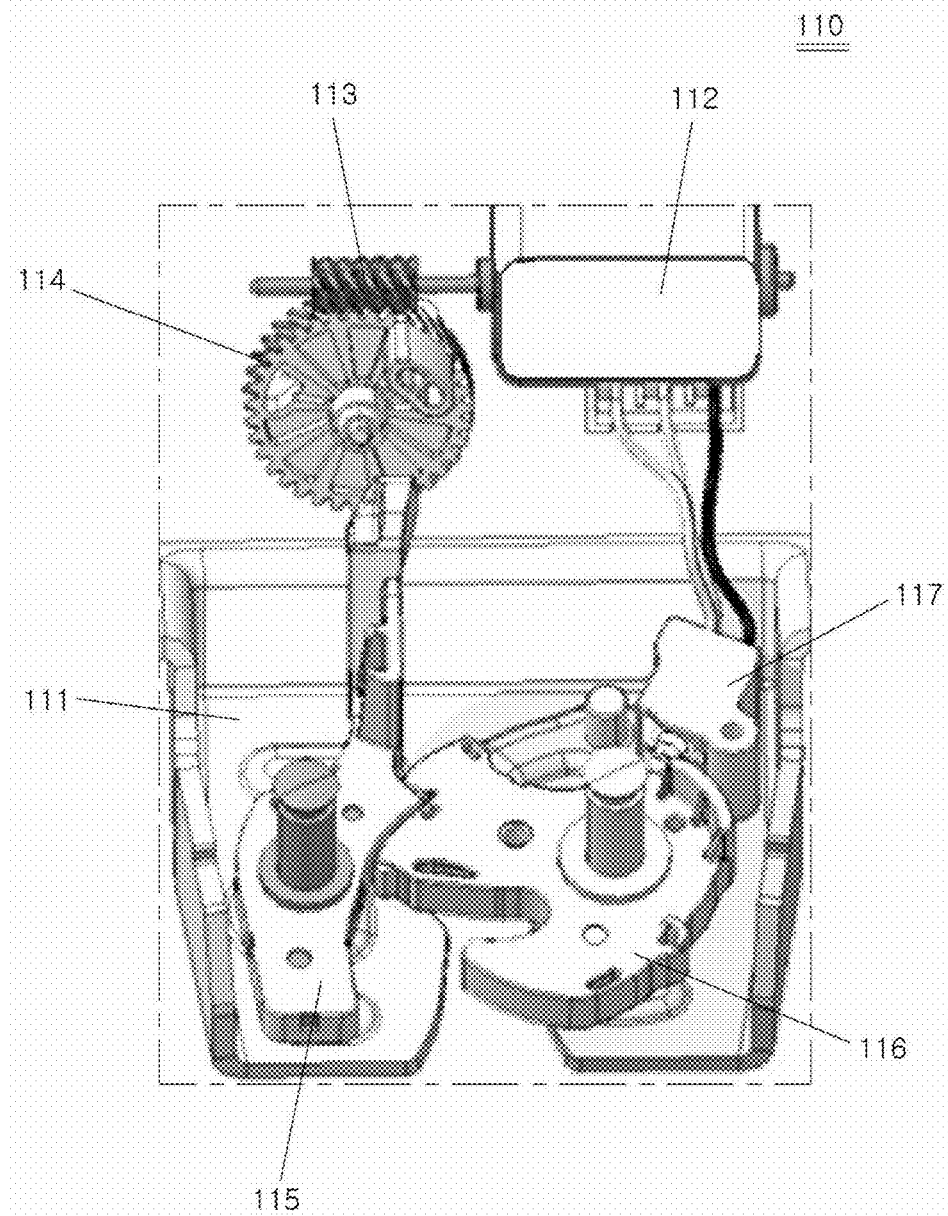
FIG. 3 is a perspective view showing a malfunctioning state of the tailgate latch assembly for a vehicle according to the prior art.

Hereinafter, a tailgate latch assembly for a vehicle according to an exemplary embodiment of the present disclosure will be described in detail with reference to the accompanying drawings.

A tailgate latch assembly 10 for a vehicle according to an exemplary embodiment of the present disclosure is a tailgate latch assembly 10 for restraining a striker formed in a tailgate which is opened rearward of the vehicle or releasing restraint of the striker, comprising: a pawl 15 which is rotated by means of a drive motor 12 and which is supported resiliently in a direction opposite to a direction of being rotated by means of the drive motor 12 in a housing 11; a claw 16 which is supported resiliently in a direction in which restraint of the striker is released in the housing 11 and which is rotated in a direction opposite to the direction of being supported resiliently when the striker enters; and a memory lever 18 having one end for supporting a side face of the pawl 15 when the pawl 15 is rotated beyond a predetermined angle by means of the drive motor 12 and the other end fixed to the housing 11.

The housing 11 forms an external shape of the tailgate latch assembly 10 according to the embodiment of the present disclosure and allows other components which will be described later to be mounted thereto. One side of the housing 11 is formed in an incised state in order to allow a striker (not shown) to enter and exit the housing.

The drive motor 12 is driven when electric power is applied thereto whereby the tailgate latch assembly 10 can release the striker.

A worm wheel 13 is coupled to a rotating shaft of the drive motor 12 and the worm wheel 13 is meshed with a wheel gear 14. Rotational force of the drive motor 12 is transmitted to a pawl 15 which will be described later through the worm gear 13 and the wheel gear 14.

The housing 11 is provided with a claw 16 for restraining the striker and the pawl 15 for restraining the claw 16, respectively. The pawl 15 and the claw 16 are resiliently supported by springs so as to rotate in a predetermined direction, respectively. In other words, the claw 16 is resiliently supported to rotate in a direction of releasing the striker, while the pawl 15 is resiliently supported to rotate in a direction of restraining the claw 16.

Basic shapes and functions of the pawl 15 and the claw 16 are the same as those in the conventional tailgate latch assembly and therefore will not be described herein.

Figure 5:
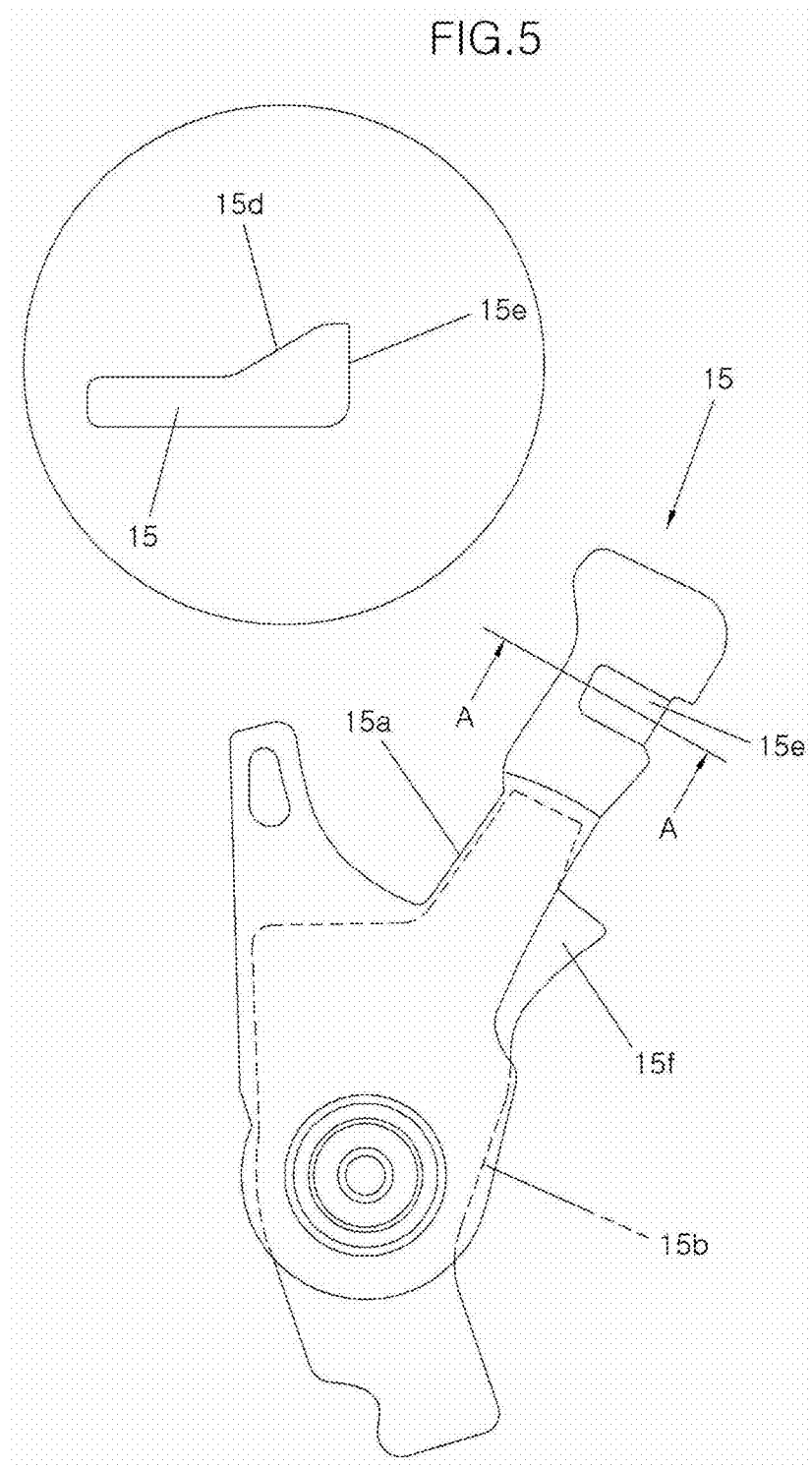
FIG. 5 is a plane view of a pawl in a tailgate latch assembly for a vehicle according to an exemplary embodiment of present disclosure.
Figure 6:
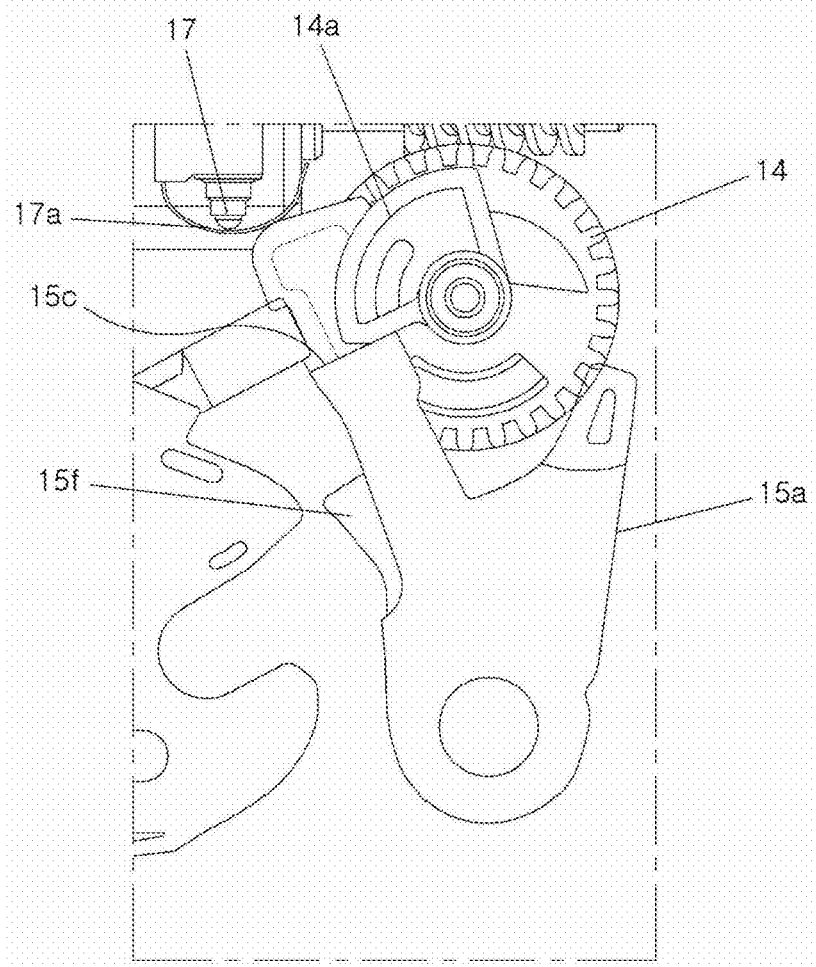
FIG. 6 is a rear view showing a moment when a pawl is separated from a claw in a tailgate latch assembly for a vehicle according to an exemplary embodiment of the present disclosure.
Figure 7:
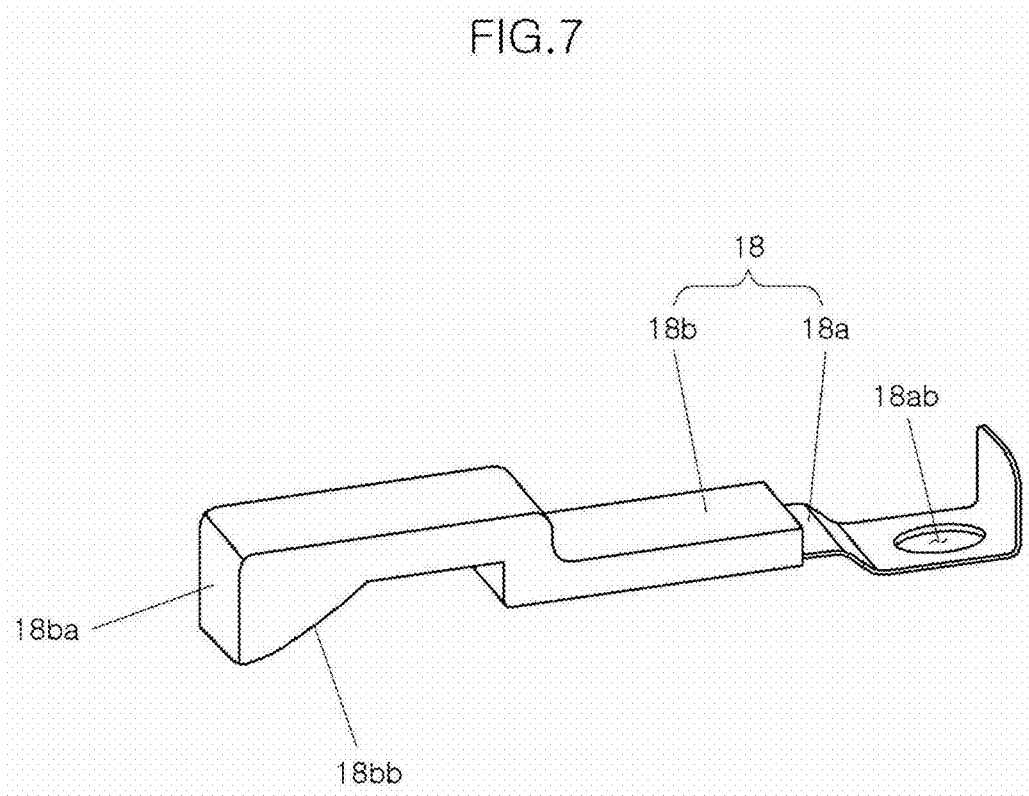
FIG. 7 is a perspective view of a memory lever of a tailgate latch assembly for a vehicle according to an exemplary embodiment of the present disclosure.
Figure 8:
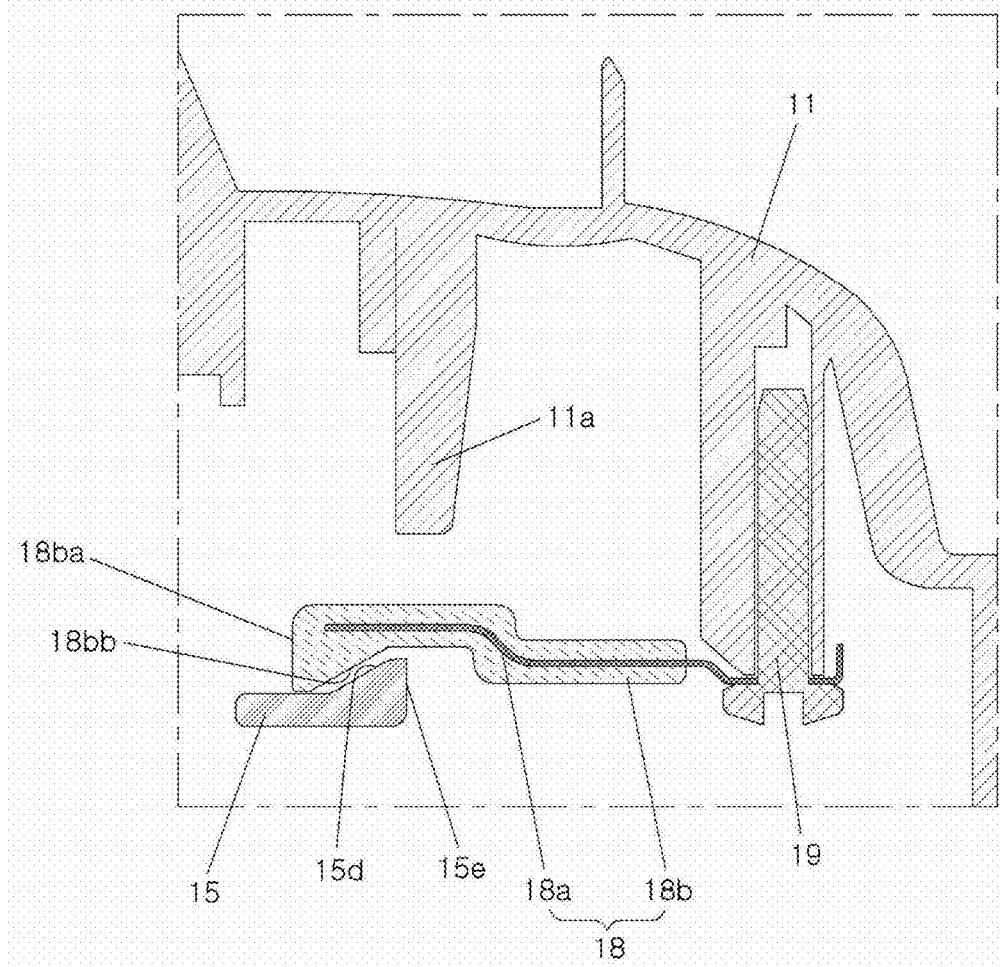
FIG. 8 is a cross section view showing a state in which a memory lever is installed in a tailgate latch assembly for a vehicle according to an exemplary embodiment of the present disclosure.

The pawl 15 comprises an insert 15b formed in the inside thereof and a body 15a injection-molded on the outside of the insert 15b. The pawl 15 is shown in FIG. 5 in which the portion indicated by the dotted line denotes the insert 15b and injection-molded on the outside of the insert 15b is the body 15a.

The insert 15b is made of a metal such as steel. The major part of the insert 15b is arranged in the inside of the pawl 15 to keep rigidity of the pawl 15. However, a part of the insert is exposed to the outside to interact directly with other components. For example, a stopper 15f for obstructing rotation of the claw 16 at the time when the claw 16 is opened in a first step is formed at one side of the pawl 15 so as to be exposed to the outside.

On the other hand, the pawl 15 is provided with a stop plane 15e for maintaining a state rotated by a memory lever 18 which will be described later and an inclined plane 15d for allowing the pawl 15 to pass over the memory lever 18 and then rotate.

The stop plane 15e is formed at one end of the pawl 15, particularly on the side facing the claw 16. The stop plane 15e is formed to be perpendicular to the direction in which the pawl 15 rotates. The stop plane 15e comes into face-to-face contact with a stop plane 18ba of the memory lever 18, which will be described later, to prevent the stop plane 15e from rotating toward the claw 16.

The inclined plane 15d is formed at the other end of the pawl 15, that is, at the top face of the pawl 15.

A catching ledge 15c is formed between a tip end of the pawl 15 and the center of rotation of the pawl 15. The catching ledge 15c abuts against the stopper 14a formed on one side of the wheel gear 14 when the pawl 15 is separated from the claw 16, thereby preventing the wheel gear 14 and the pawl 15 from rotating any further.

The memory lever 18 is configured to support the side face of the pawl 15 so as to prevent the pawl 15 from rotating in a direction of returning when the pawl 15 is rotated beyond a predetermined angle by means of the drive motor 12. The memory lever 18 is configured such that when the pawl 15 passes over the memory lever 18 in a state where one end, preferably the rear end of the memory lever is fixed to one side of the housing 11, the other end of the memory lever 18, for example, the front end of the memory lever 18 supports the side face of the pawl 15 to prevent the pawl 15 from returning.

The memory lever 18 comprises a resilient member 18a fixed to one side of the housing 11 and a body 18b formed integrally with the resilient member 18a on the outside of the resilient member 18a. Particularly, as the resilient member 18a is installed to the side where the claw 16 is fixed, and a stop plane 18ba is formed toward the pawl 15, the resilient member 18a may effectively prevent the pawl 15 from returning.

The resilient member 18a is machined using a thin metal plate. Since the resilient member 18a is made of the thin metal plate, the memory lever 18 can be resiliently deformed and then restored to its original state.

One end of the resilient member 18a, that is, the rear end of the resilient member 18a is formed with a fastening hole 18ab for allowing the resilient member to be fastened to the housing 11. The fastening hole 18ab allows a fastening member such as a fastening bolt 19 to penetrate therethrough so that the memory lever 18 is fastened to the housing 11.

The body 18b is injection-molded using a synthetic resin material in a state in which the resilient member 18a is inserted therein. The body 18b has the form of a block.

The body 18b includes the stop plane 18ba for stopping the pawl 15 so as not to face the claw 16 and an inclined plane 18bb to raise the memory lever 18 by the inclined plane 15d of the pawl 15 when the pawl 15 is rotated by means of the drive motor 12.

The stop plane 18ba is formed perpendicularly at one end of the body 18b, for example, the front end of the body 18b. The stop plane 18ba comes into face-to-face contact with the stop plane 15e formed on one side face of the pawl 15 to prevent the pawl 15 from rotating toward the claw 16.

The inclined plane 18bb allows the pawl 15 to pass over the end of the memory lever 18 when the pawl 15 is rotated by means of the drive motor 12. The memory lever 18 rides on and passes over the inclined plane 15d of the pawl 15 while the inclined plane 18bb is in contact with the inclined plane 15d formed on the pawl 15 so that the pawl 15 can rotate.

A release protrusion 16a for raising the other end of the memory lever 18 is formed on the surface of the claw 16. The release protrusion 16a raises the memory lever 18 when the claw 16 is rotated and then the release protrusion 16a comes into contact with the memory lever 18.

Here, it is to be noted that the direction in which the memory lever 18 is raised is different from spring force for restoring the pawl 15 to its original position such that the pawl 15 is maintained stably in a restrained state.

A switch 17 for detecting separation of the pawl 15 from the claw 16 is installed at one side of the housing 11 and the housing 11 is provided with a plate 17a for operating the switch 17 at the time when the pawl 15 is separated from the claw 16. The plate 17a is made of a metal material so that when the pawl 15 is separated from the claw 16, the pawl is deformed and in turn depresses the switch 17 to allow the switch 17 to detect separation of the pawl 15 from the claw 16.

Next, operation of the tailgate latch assembly for a vehicle according to an exemplary embodiment of the present disclosure having the configuration as described above will be described below.

Figure 4:
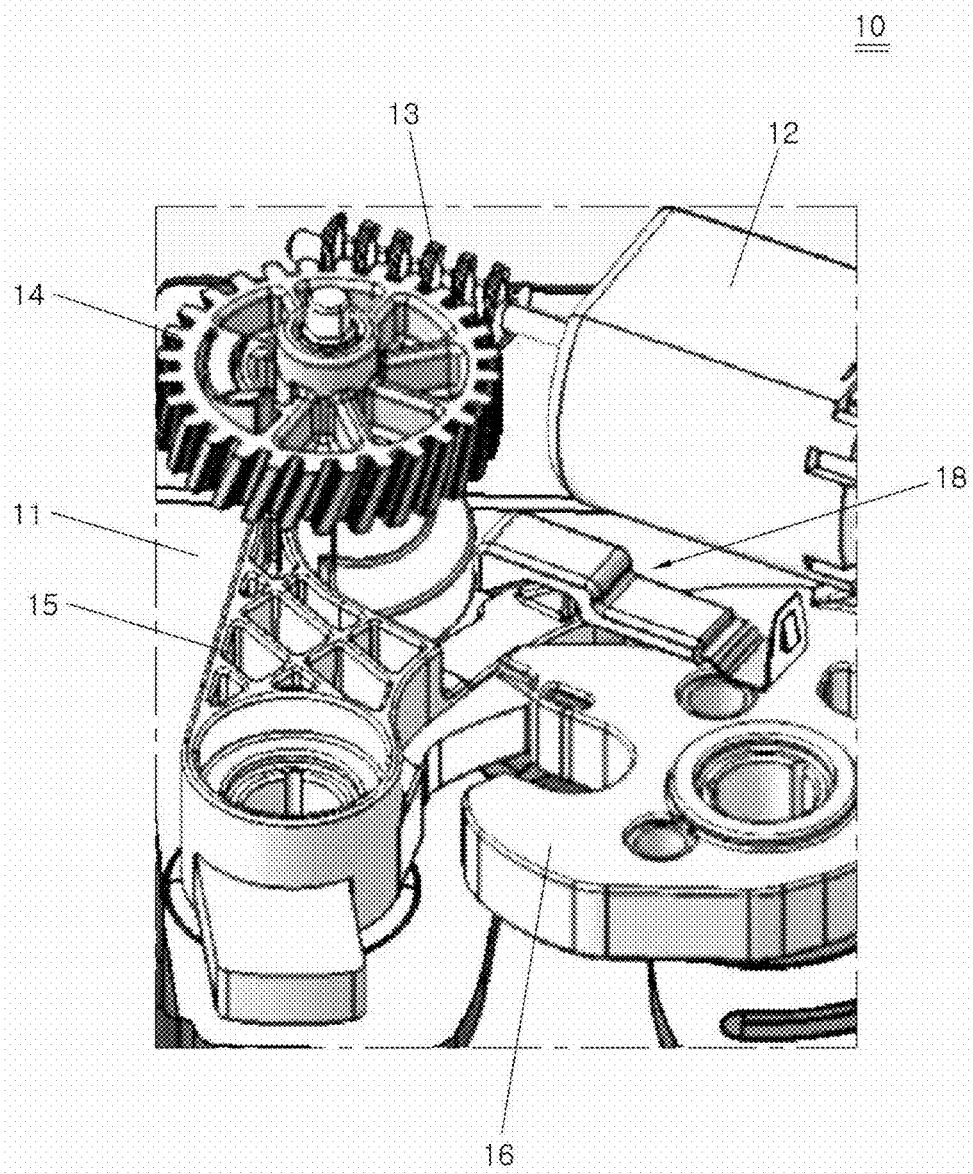
FIG. 4 is a perspective view of a tailgate latch assembly for a vehicle according to an exemplary embodiment of present disclosure.

FIG. 4 shows the case where the tailgate latch assembly 10 is fully locked.

Since the claw 16 restrains the striker (not shown) and the claw 16 is restrained by the stopper 15f of the pawl 15 so as not to rotate in a direction of releasing the striker, the tailgate latch assembly 10 remains locked.

Thereafter, when electric power is applied to the drive motor 12, the worm gear 13 and the wheel gear 14 are rotated. When the wheel gear 14 is rotated, an actuation protrusion formed on one side of the wheel gear 14 hits the end of the pawl 15 whereby the pawl 15 is rotated.

When the pawl 15 is rotated, the inclined plane 15d of the pawl 15 and the inclined plane 18bb of the memory lever 18 come into contact with each other. Afterwards, the inclined plane 15d of the pawl 15 and the inclined plane 18bb of the memory lever 18 contact with each other while the pawl 15 is continued to rotate, with the result that the pawl 15 raises the front end of the memory lever 18.

Since the pawl 15 and the memory lever 18 contact with each other by means of their inclined planes 15d and 18bb, the front end of the memory lever 18 is raised as the pawl 15 rotates.

When the pawl 15 continues to rotate, the pawl 15 passes over the memory lever 18.

Figure 9:
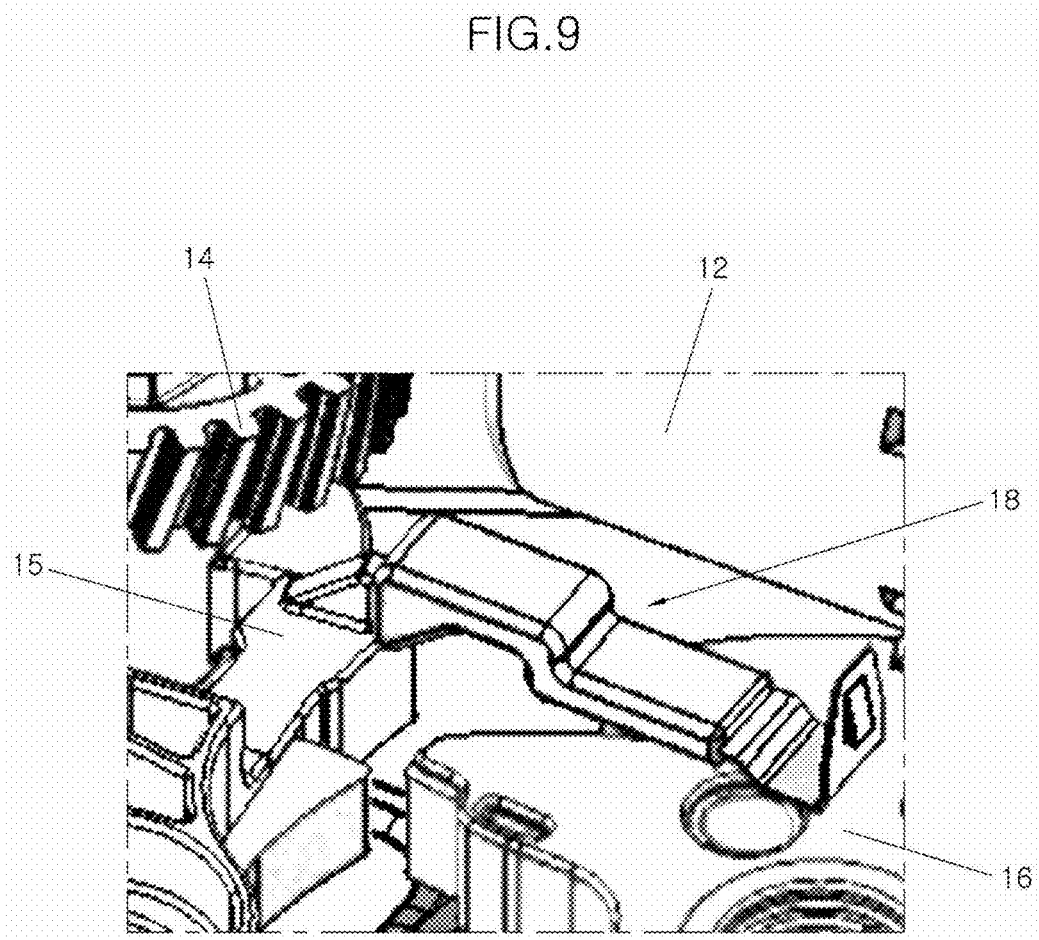
FIG. 9 is a perspective view showing an intermediate state in which a tailgate latch assembly for a vehicle according to an exemplary embodiment of the present disclosure is in the process of being released.

Thereafter, even if electric power to the drive motor 12 is cut off, the pawl 15 cannot be rotated toward the claw 16. In other words, as shown in FIG. 9, when electric power to the drive motor 12 is cut off, the pawl 15 can no longer be rotated toward the claw 16 even if any rotational movement of the pawl 15 toward the claw 16 occurs because the pawl 15 and the memory lever 18 are in contact with each other through the stop planes 15e and 18ba.

Figure 10:
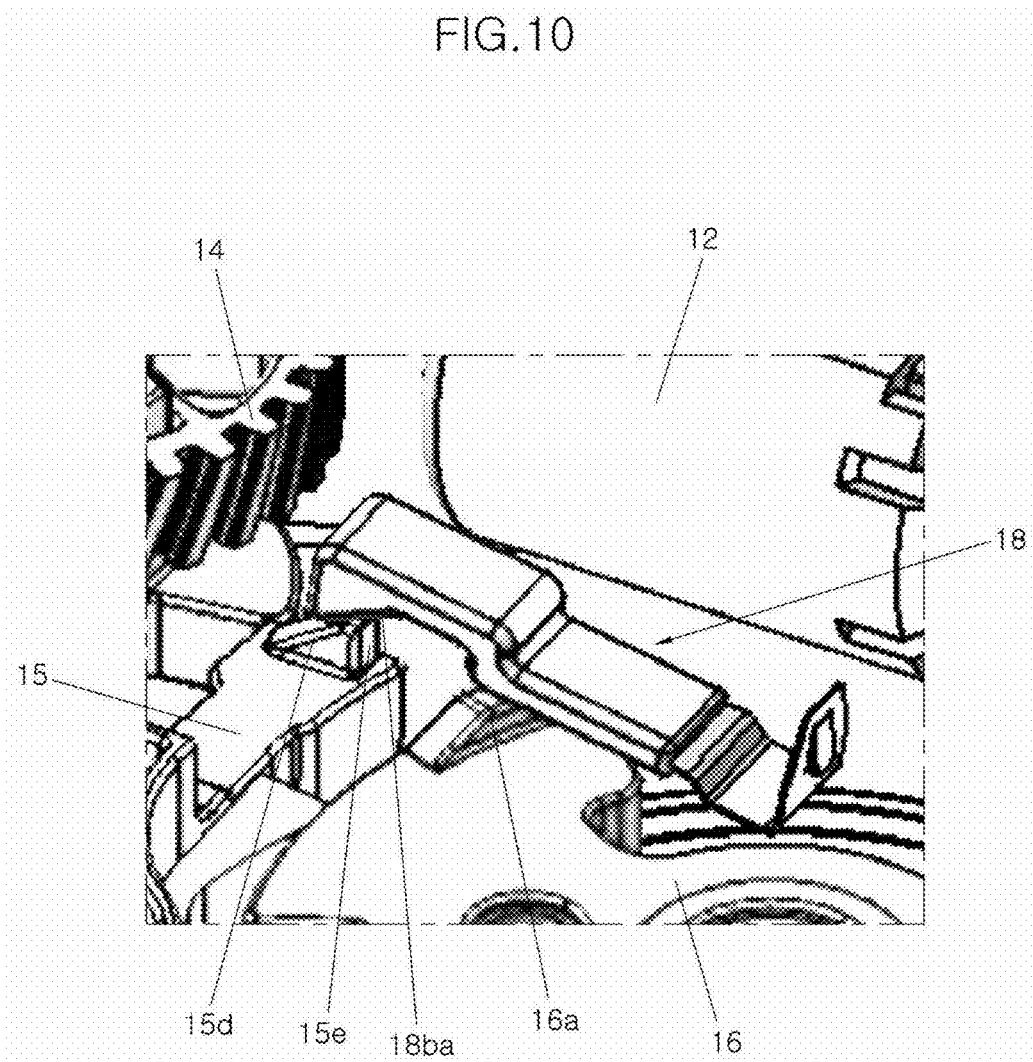
FIG. 10 is a perspective view showing a final state in which a tailgate latch assembly for a vehicle according to an exemplary embodiment of the present disclosure is completely released.

On the other hand, as shown in FIG. 10, when the claw 16 is rotated, the release protrusion 16a formed on the claw 16 comes into contact with the bottom face of the memory lever 18 an in turn raises the other end of the memory lever 18. When the other end of the memory lever 18 is raised by means of the release protrusion 16a, the stop planes 15e and 18ba of the pawl 15 and the memory lever 18 are separated from each other so that the pawl 15 can return to its initial state. In other words, when the other end of the memory lever 18 is raised, the pawl 15 passes over both the stop plane 18ba and the inclined plane 18bb of the memory lever 18 and moves into the inside of the memory lever 18 so that the pawl can return to its initial state.

Figure 11:
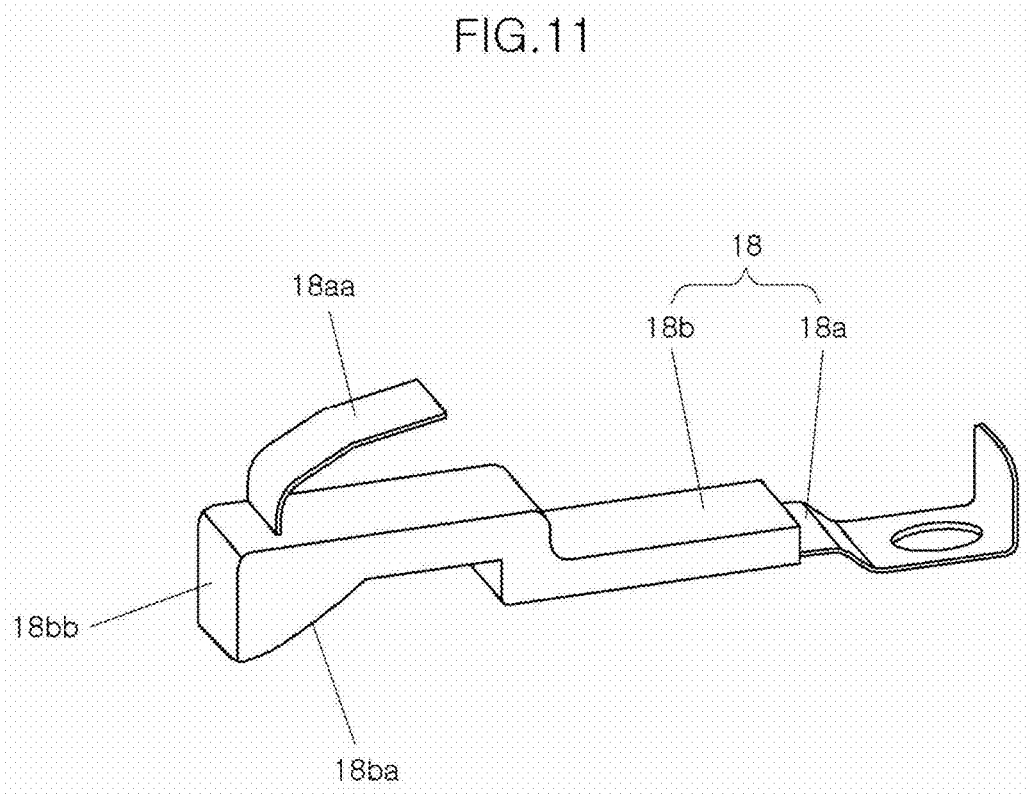
FIG. 11 is a perspective view of a memory lever of a tailgate latch assembly for a vehicle according to another exemplary embodiment of the present disclosure.
Figure 12:
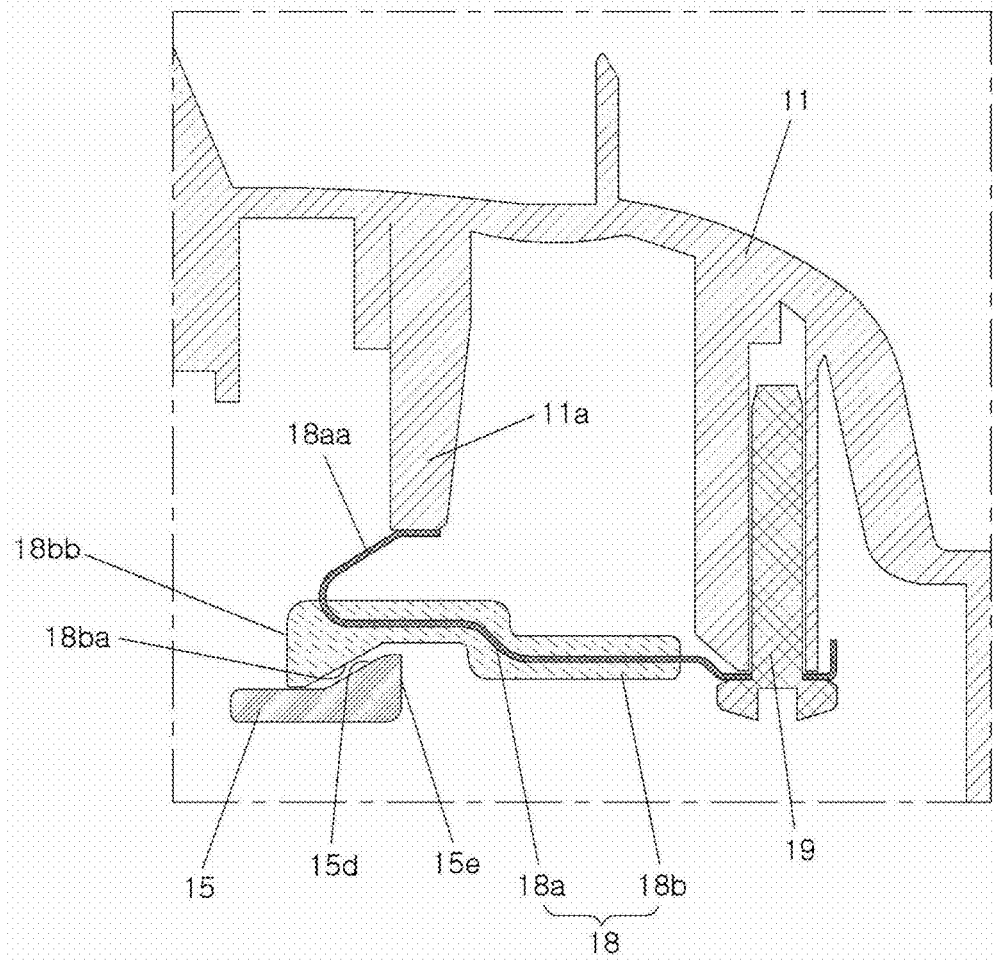
FIG. 12 is a cross section view showing a state in which a memory lever is installed in a tailgate latch assembly for a vehicle according to another exemplary embodiment of the present disclosure.

On the other hand, FIGS. 11 and 12 show a memory lever 18 according to another exemplary embodiment of the present disclosure and a state in which a memory lever 18e is mounted, respectively.

The memory lever 18 is configured such that a resilient part 18aa is formed on the resilient member 18a in order to allow the memory lever 18 to easily return to its original position after actuation.

In other words, the front end of the resilient member 18a is provided with the resilient part 18aa. The resilient part 18aa protrudes from the top end of the body 18b and then extends along the body 18b with an interval from the body 18b maintained. The resilient part 18aa is spaced apart from the body 18b.

Since the resilient part 18aa is supported resiliently at one side of the housing 11, the memory lever 18 can easily return to its original state after being raised.

Although the present disclosure has been described in the foregoing with reference to the drawings illustrated by way of example, the present disclosure is not limited to the disclosed embodiments, and it will be apparent to those of ordinary skill in the art that various modifications and variations can be made to the present disclosure without departing from the spirit and scope of the disclosure. Therefore, such modifications or variations fall within the scope of the present disclosure as claimed and the scope of the present disclosure should be interpreted based on the appended claims.

What is claimed is:

1. A tailgate latch assembly for restraining a striker of a tailgate, which is configured to be opened or closed rearward of a vehicle, or for releasing restraint of the striker, comprising:
   a pawl configured to be rotated by a drive motor, the pawl being supported resiliently in a direction opposite to a direction of being rotated by the drive motor in a housing;
   a claw supported resiliently in a direction in which restraint of the striker is released in the housing, the claw being configured to rotate in a direction opposite to the direction of being supported resiliently when the striker is restrained in the claw;
   a memory lever having a first end for supporting a side face of the pawl when the pawl is rotated beyond a predetermined angle by the drive motor and a second end fixed to the housing;
   a wheel gear having a stopper at one side face thereof and configured to stop rotation of the wheel gear at the time when the pawl is separated from the claw; and
   a catching ledge at a bottom face of the pawl and configured to be caught by the stopper,
   wherein, when the pawl is separated from the claw, the catching ledge is caught by the
   stopper whereby rotation of the pawl is stopped.

2. The tailgate latch assembly according to claim 1, wherein the memory lever comprises:
   a first stop plane at one end thereof for supporting one side face of the pawl; and
   a second stop plane at one end of the pawl to face the first stop plane, wherein the first stop plane of the memory lever is arranged to face the pawl so as to prevent the pawl from returning from a rotated state of the pawl to an initial state.

3. The tailgate latch assembly according to claim 1, wherein the pawl has a first inclined plane at one end thereof such that the pawl can pass over the memory lever when the pawl is rotated in a state where the striker is restrained by the claw, and the memory lever has a second inclined plane at one end thereof corresponding to the first inclined plane of the pawl.

4. The tailgate latch assembly according to claim 3, wherein the first inclined plane is inclined in such a manner that a height thereof increases toward the claw.

5. The tailgate latch assembly according to claim 1, wherein the pawl comprises:
   a metallic insert therein; and
   a body disposed on an outside of the metallic insert.

6. The tailgate latch assembly according to claim 5, wherein the metallic insert is composed of steel.

7. The tailgate latch assembly according to claim 5, wherein a part of the insert is exposed to an outside of the body.

8. The tailgate latch assembly according to claim 7, wherein the insert has a stopper protruding outwardly for preventing rotation of the claw.

9. The tailgate latch assembly according to claim 1, wherein the memory lever is supported resiliently to the housing such that a first end of the memory lever supporting the side face of the pawl is raised or lowered with respect to a second end of the memory lever fastened to the housing.

10. The tailgate latch assembly according to claim 9, wherein the memory lever comprises:
    a resilient member composed of a metal material and having one end fastened to the housing; and
    a body disposed on an outside of the resilient member.

11. The tailgate latch assembly according to claim 10, wherein a fastening hole is defined at the one end of the resilient member, and
  wherein the resilient member is fastened to the housing by a fastening bolt screwed onto the housing through the fastening hole.

12. The tailgate latch assembly according to claim 10, wherein another end of the resilient member protrudes to one side of the body supported resiliently to one side of the housing.

13. The tailgate latch assembly according to claim 1, wherein the claw has a release protrusion at one side face thereof for raising the memory lever at the time when electric power to the drive motor is cut off and thus the pawl returns.

14. The tailgate latch assembly according to claim 1, further comprising a switch at one side of the housing for detecting separation of the pawl from the claw,
  wherein the housing comprises a plate for operating the switch at the time when the pawl is separated from the claw.

\* \* \* \* \*